Feb. 16, 1954  J. P. BUTTERFIELD  2,669,315
TORQUE COMPENSATED LINK SUSPENSION
Filed April 12, 1952  2 Sheets-Sheet 1
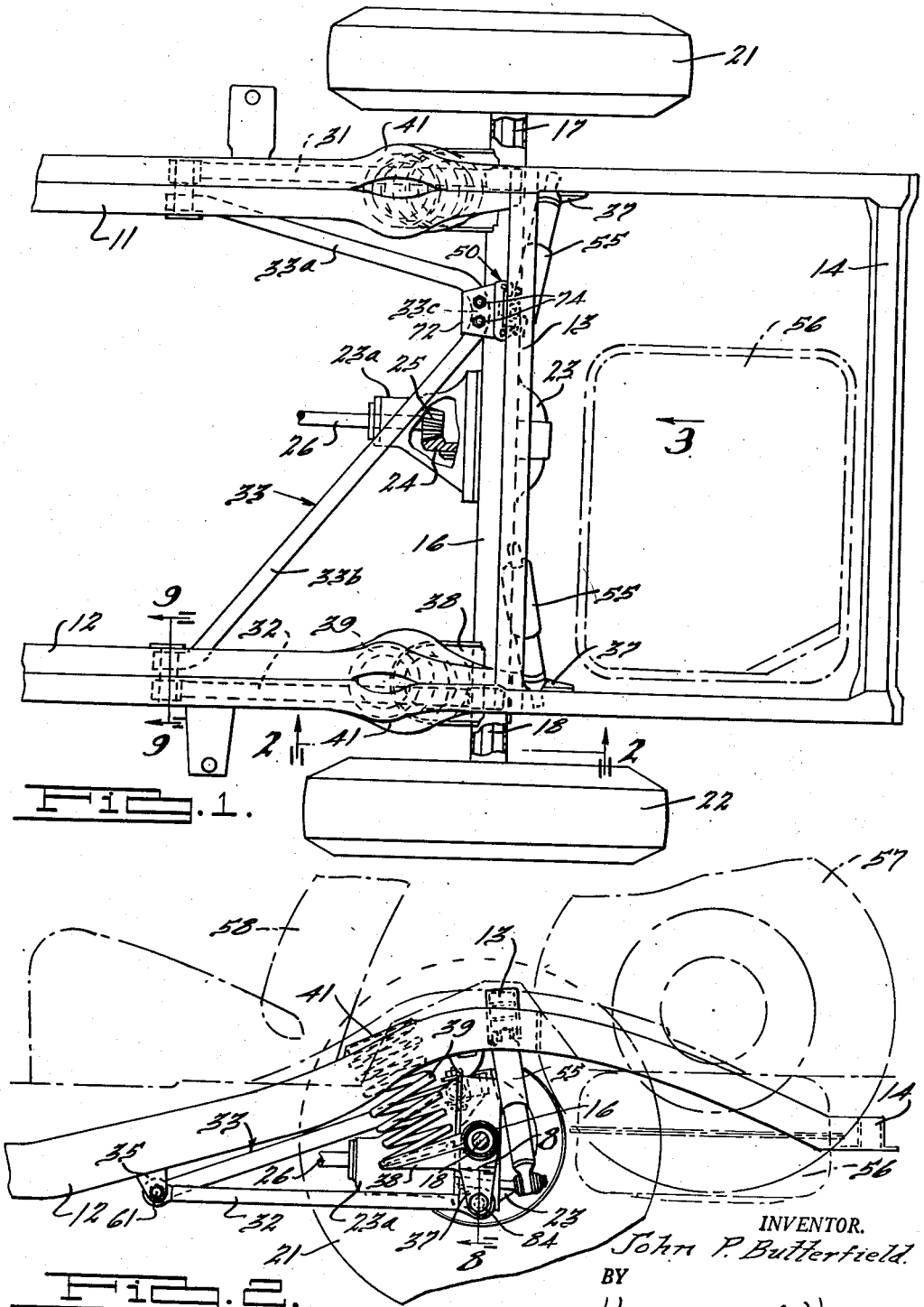
INVENTOR.
John P. Butterfield
BY
Harness and Harris
ATTORNEYS

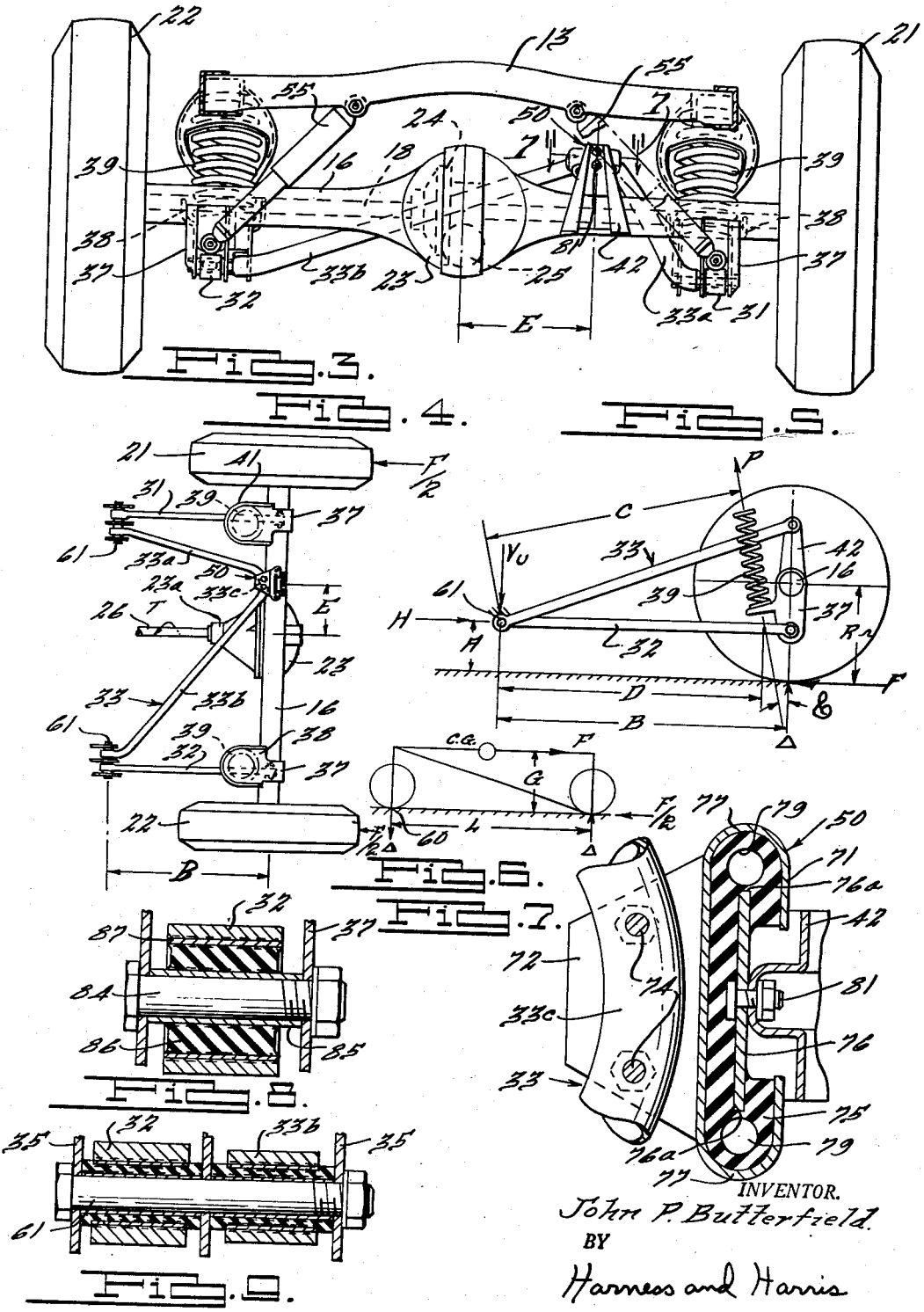

Patented Feb. 16, 1954

2,669,315

UNITED STATES PATENT OFFICE 2,669,315

TORQUE COMPENSATED LINK SUSPENSION

John P. Butterfield, Grosse Pointe Park, Mich., assignor to Chrysler Corporation, Highland Park, Mich., a corporation of Delaware Application April 12, 1952, Serial No. 282,028

8 Claims. (Cl. 180—71)

This invention relates to motor vehicle wheel suspension systems and particularly to the suspension means for the driving wheels of a motor vehicle wherein said driving wheels are carried by a rigid axle carrier that is connected to the associated chassis frame through a plurality of pivoted links.

It is a primary object of this invention to provide a torque compensated suspension for the vehicle driving wheels that maintains equal traction in each of the driving wheels during vehicle acceleration and thus eliminates the slipping of one of the driving wheels that usually occurs during accelerating drive.

It is another object of this invention to provide a torque compensated suspension for the driving wheels of a motor vehicle that reduces the coupling of tramp, yaw and lateral vibration of the rear axle assembly.

It is still another object of this invention to provide a simplified form of link suspension for the rigid driving axle carrier of a motor vehicle that will give maximum traction and permit the use of coil spring chassis suspension elements.

It is a further object of this invention to provide a driving wheel suspension system that eliminates the body roll on accelerating drive that is normally consequent to propeller shaft torque.

It is still another object of this invention to provide a link type driving wheel suspension system that permits isolation of the axles from the body by soft resilient connections at the link ends which connections are so designed that positive directional control of the axles is retained.

Other objects and advantages of this invention will become readily apparent from a reading of the following specification and a consideration of the related drawings wherein:

Fig. 1 is a top plan elevational view of the rear end of a motor vehicle chassis having a rigid driving wheel axle carrier connected to the chassis frame through linkages embodying this invention;

Fig. 2 is a side elevational view of the rear end of the motor vehicle chassis shown in Fig. 1 looking in the direction of the arrows 2—2 of Fig. 1;

Fig. 3 is a rear end elevational view of the chassis frame structure shown in Figs. 1 and 2, the view being taken looking in the direction of the arrow 3 of Fig. 1;

Fig. 4 is a diagrammatic view corresponding to Fig. 1;

Fig. 5 is a diagrammatic view corresponding to Fig. 2;

Fig. 6 is a diagrammatic view showing the relative position of the center of gravity of the chassis frame with respect to the frame supporting wheels;

Fig. 7 is an enlarged fragmentary sectional elevational view of the resilient connection between the apex portion of the V-shaped upper suspension link and the axle carrier, the view being taken along the reference line 7—7 of Fig. 3;

Fig. 8 is an enlarged, fragmentary sectional elevational view of the resilient connection between the rear end of a lower suspension link and the axle carrier, the view being taken along the reference line 8—8 of Fig. 2; and Fig. 9 is an enlarged, fragmentary, sectional elevational view of the resilient connections between the front end of the upper and lower suspension links and the chassis frame, the view being taken along the reference line 9—9 of Fig. 1.

Figs. 1-3 show the rear end portion of a motor vehicle chassis frame that includes the longitudinally extending, spaced apart side rails 11 and 12 and the transversely extending connecting cross rails 13 and 14. Located substantially beneath the cross rail 13 is a rigid axle carrier housing 16. Housing 16 supports the pair of rigid axles 17 and 18 that have their outer ends connected respectively to the vehicle driving wheels 21 and 22. Rigid axles 17 and 18 each have their adjacent inner ends connected to the differential gearing (not shown) that is mounted within the banjo chamber 23 at the center of the axle carrier 16. The differential gearing includes a ring gear 24 that is drivingly connected to the pinion gear 25 that is mounted on the rear end of the engine driven propeller shaft 26.

The driving wheel axle carrier 16 is connected to the chassis frame elements 11, 12, 13 by a linkage and coil spring arrangement that overcomes certain of the known disadvantages of wheel suspension systems of this general type. The linkage system herein disclosed for connecting the axle carrier 16 to the chassis frame comprises a pair of rigid, longitudinally extending, horizontally disposed, spaced apart, lower links 31 and 32 and a rigid, longitudinally extending, V-shaped, upper link 33 that is disposed in a plane that slopes forwardly and downwardly from the axle carrier 16 towards the front of the vehicle. Each of the rigid lower links 31 and 32 has its forward end pivotally connected to a bracket 35 fixedly mounted on the underside of a chassis frame side rail 11 or 12, as clearly shown in Fig. 9, and its rear end is pivotally connected to a bracket 37 fixedly mounted on the axle carrier 16 as clearly shown in Fig. 8. The bracket 37 has a forwardly extending, step-like flange 38 projecting therefrom that provides a seat for a cylindrical coil spring 39. The coil springs 39 mounted on each of the flange seats 38 extend upwardly and engage a seat formation 41 formed on the overlying chassis side rail member 11 or 12. The seat 41 may be formed as an integral part of the side rail or it could be a separate bracket element that is connected to the side rail member.

The rigid V-shaped upper link 33 is of unsymmetrical design and includes a relatively short leg 33a and a relatively long leg 33b, these legs being interconnected by an arcuate apex portion 33c. The apex portion 33c of the V-shaped link 33 is connected through a resilient connection 50, shown in detail in Fig. 7, to a bracket 42 fixedly mounted on the axle carrier 16. Bracket 42 is offset from the center of the length of carrier 16 by a distance E for a reason that will subsequently become apparent. The forwardly extending free ends of each of the legs 33a and 33b of the V-shaped link 33 are each pivotally connected to one of the chassis frame mounted brackets 35 in the manner clearly shown in Fig. 9.

To assist in the control of the movement of the sprung chassis frame, shock absorber elements 55 are connected between each bracket 37 on the axle carrier 16 and the overlying chassis frame cross member 13. These absorber units 55 extend in a vertically disposed plane and may be arranged to converge towards the longitudinal center of the chassis frame as shown. Figs. 1 and 2 also show in dashed outlines the positions of the vehicle fuel link 56, the spare tire 57 and the rear seat 58.

It is well known that when increased torque T is applied to the propeller or drive shaft 26 of a chassis unit of the general type disclosed to cause vehicle acceleration, that generally one of the driving wheels slips relative to the other and thus accelerating power is lost. This wheel slipping or loss of tractive effort is due to the fact that the forces applied to the driving wheels is unequal during accelerating drive due to one wheel being urged against the ground surface with an increased force while the other wheel has its surface engaging force reduced. This unbalancing in the wheel applying forces results from the fact that the drive shaft pinion 25 is arranged on the right side of the ring gear 24 (when looking from the rear of the chassis towards the front). With the disclosed conventional pinion and ring gear arrangement, a torque load is applied to the axle carrier 16 that does two things: first, the carrier 16 tends to rotate counterclockwise about the drive shaft 26 and the left wheel is urged downwardly against the ground surface with increased force while the right wheel tends to rise off the ground surface and this reduces the frictional ground engaging forces and permits the right wheel to slip relative to the left wheel; second, when the increased torque load is applied to shaft 26 the reaction between the wheels 21, 22 and the ground surface tends to cause the axle carrier 16 to rotate clockwise about the axles 17, 18 and swing the nose end 23a of the differential case 23 upwardly and rearwardly. The disclosed arrangement of the V-shaped suspension link 33 provides torque compensating forces that oppose and neutralize the aforementioned unbalancing forces so as to maintain equal traction forces at each of the driving wheels during drive and thereby eliminate wheel slip and the consequent loss of power and vehicle control.

As previously pointed out the torque of the drive shaft tends to rotate the axle carrier 16 in a clockwise direction such that the nose 23a of the differential case will swing upwardly and rearwardly. Such a rotational tendency will develop tension forces in the legs 33a and 33b of the V-shaped link 33. As the V-shaped link 33 extends in a plane that slopes forwardly and downwardly from the top of the axle carrier bracket 42, it is thought to be obvious that the tension forces in the legs of the link 33 have horizontal and vertical components. Furthermore, these vertical components can be used to oppose and neutralize the aforementioned forces that tend to reduce the traction at the right driving wheel if the link 33 is correctly located in the geometry of the carrier suspension. By placing the apex 33c of the V-shaped link 33 on the right side of the differential case 33 at a predetermined laterally offset position with relation to drive shaft 26, it is possible to have the clockwise moment of the vertical components of the tension forces in the legs of the link 33 balance the counterclockwise moment of the drive shaft generated carrier rotating forces acting about propeller shaft 26 and thus maintain equal ground applying forces on each of the vehicle driving wheels 21 and 22.

The exact amount of lateral offset E of the apex of the V-shaped link 33 with respect to the drive shaft 26, in order to obtain the desired equal tractive force on each driving wheel 21, 22 during drive, can be determined from a consideration of Figs. 4, 5, 6 and the equations and description appearing hereafter. Knowing the dimensions or values for A, B, C, &, G, L, $R_r$ and the axle ratio N, which dimensions or values are each readily obtainable for any given chassis construction, the dimension E for the amount of upper link offset to prevent body roll and maintain equal wheel reaction forces during drive torque can be determined from the equation set forth below. In deriving the below equation the following assumptions were made to simplify the analysis and to make it valid for any value of drive shaft torque T: (1) the resultant of all horizontal forces F opposing motion of the vehicle, including the intertia force if accelerating, acts at height G above the ground. For most practical cases this may be assumed to be the height of the center of gravity of the vehicle above the ground; (2) the lower links 31, 32 are horizontal; and, (3) the effects of suspension geometry changes resulting from wheel jounce and rebound on the application of a torque T to drive shaft 26 are negligible.

Looking at Fig. 6 first, it is thought to be obvious that if moments are taken about the pivot center 60 that:

(1) $$\Delta L = FG \text{ or } \Delta = \frac{FG}{L}$$

Then looking at Fig. 5 and taking moments about the pivot center 61 for the front ends of the lower and upper links 32, 33 respectively and considering the coil spring 39 to be exerting a change in force P acting upwardly in the direction shown by the vector, it will be found that:

(2) $$PC = FA - \Delta B$$

and substituting for $\Delta$ from equation (1)

(3) $$P = \frac{F}{C}\left(A - \frac{BG}{L}\right)$$

Next to determine the vertical component of the tension forces acting in the legs $33a$, $33b$ of the upper link $33$ due to the tendency of the axle carrier $16$ to rotate clockwise around the axles $17$, $18$ when a torque $T$ is applied to the drive shaft $26$, it will be found that these vertical components $Vu$ that are used to maintain equal loading of the driving wheels are expressed as follows:

(4) $$Vu = \Delta + P \cos \&$$

and substituting for $\Delta$ and $P$ from equations (1) and (3) then (5) $$Vu = F\left[\frac{G}{L} + \frac{\cos \&}{C}\left(A - \frac{BG}{L}\right)\right]$$

It can be shown that $$\frac{\cos \&}{C} = \frac{1}{D}$$

and $D$ is readily determined.

It can also be shown that the drive shaft torque $T$ is expressed by the equation (6) $$T = \frac{FRr}{N} = VuE \text{ or } E = \frac{FRr}{NVu}$$

Then combining equations (5) and (6)

(7) $$E = \frac{Rr}{N}\frac{1}{\left[\frac{G}{L} + \frac{\cos \&}{C}\left(A - \frac{BG}{L}\right)\right]}$$

Now it can also be shown that when the chassis elements are so designed that (8) $$\frac{A}{B} = \frac{G}{L} \text{ or } A = \frac{BG}{L}$$

then by substituting for $A$ in equation (7)

(9) $$E = \frac{Rr}{N}\frac{L}{G}$$

or if as established in (8) that $$\frac{A}{B} = \frac{G}{L}$$

then

(10) $$E = \frac{Rr}{N}\frac{B}{A}$$

From equation (7) it is possible by direct measurement of any particular chassis unit to readily determine the amount of lateral offset of the fulcrum point for the apex $33c$ of the upper link $33$ in order to maintain equal traction at each driving wheel during acceleration in a suspension system of the type disclosed. Likewise equation (10) determines the offset $E$ in any suspension system of the disclosed type when the system is laid out such that the relationship $$\frac{A}{B} = \frac{G}{L}$$

In the above equations:

$A$ = height of lower horizontal links $32$, $33$ above ground
$B$ = length of lower horizontal links $32$, $33$
$C$ = distance between lower link front end and action line of spring $39$
$D$ = distance from lower link front end to intersection with action line of spring $39$
$\Delta$ = change in vertical reaction at the front and rear wheels
$\&$ = angle of tilt of spring $39$ relative to a vertical to the ground
$E$ = offset of upper link fulcrum $33c$ relative to the center of length of the carrier $16$
$F$ = resultant traction force acting along ground that is split equally between the driving wheels $21$, $22$
$G$ = height of vehicle center of gravity above ground at which all horizontal forces are considered to act
$L$ = wheelbase of vehicle
$N$ = ratio of speed of rotation of drive shaft $26$ to wheels $21$, $22$
$P$ = change in force exerted by the compression spring $39$
$Rr$ = rolling radius of driving wheels $21$, $22$
$T$ = torque of drive shaft $26$
$Vu$ = vertical components of the forces set up in link $33$ Fig. 7 shows the particular type of flexible connection $50$ used to connect the apex portion $33c$ of the upper V-shaped link $33$ to the bracket $42$ that is fixedly mounted on the axle carrier $16$. The connection $50$ comprises a bracket plate $71$ of C-shaped cross sectional configuration that has a pair of vertically spaced apart flanges $72$ that project outwardly from the body portion of the plate $71$ and provide a yoke formation to receive the apex portion $33c$ of the upper link $33$. Bolt elements $74$ anchor the link apex portion $33c$ to the bracket plate flanges $72$. The area within the C-shaped bracket plate $71$ is filled with a resilient material $75$ such as rubber or the like. Integrally formed in the block of resilient material $75$ is a rigid intermediate plate member $76$. Plate $76$ does not extend the full distance between the curved ends of the bracket plate $71$ but has its end edges $76a$ spaced inwardly from the curved ends $77$ of the bracket plate $71$. The resilient material $75$ between the intermediate plate ends $76a$ and the curved bracket plate ends $77$ is pierced by vertically extending bores $79$. These bores $79$ reduce the rigidity of the intermediate plate support in a certain manner and permit the intermediate plate $76$ to shift longitudinally within the plate $71$ in a direction extending between the curved ends $77$ of the bracket plate. The resilient material $75$ on opposite sides of the intermediate plate is not perforated and thus a relatively stiff resistance to tension and compression forces is attained while the bores $79$ materially reduce the resistance to shear lengthwise of the plate $76$. Intermediate plate $76$ is connected by a pair of spaced bolt and nut connectors $81$ to the upwardly projecting carrier mounted bracket $42$.

The connection $50$ herein disclosed permits some lateral vibration of the axle carrier $16$ without the usually accompanying yawing that produces undesirable rear axle steering. The yawing is substantially eliminated due to the fact that the resilient material $75$ resists rotation of the axle carrier $16$ about a vertical axis while permitting lateral shift of the carrier $16$ transversely of the chassis frame. Another important feature of the disclosed suspension that produces the improved ride characteristics, due to the uncoupling of axle carrier lateral vibration from yawing movement, results from the particular manner in which the V-shaped upper link $33$ is arranged in the suspension system. Specifically, the mounting of the apex portion $33c$ of the link $33$ on the carrier bracket $42$ with the transversely spaced apart free ends of the link legs $33a$ and $33b$ pivotally anchored to chassis frame supported brackets $35$. With link $33$ arranged as disclosed, the V-shaped upper link $33$ can readily resist yawing of the carrier $16$ without requiring the longitudinally extending lower links $31$ and $32$ to be placed in tension and compression. If the link 33 should be mounted in a reversed manner such that the apex portion 33c would be anchored to a chassis cross rail member located forwardly of the carrier 16 and the free ends of the link legs 33a and 33b connected to the carrier 16 in a laterally offset relationship with respect to the drive shaft 26, then the link 33 would not of itself prevent yawing of the carrier 16 without imposing tension and compression loads in the lower links 31 and 32 respectively. Thus it is seen that the specifically disclosed arrangement of the V-shaped link 33 is distinguishable from a reversed arrangement of such an identical link due to the fact that the hereindisclosed arrangement will of itself tend to uncouple carrier yawing and lateral vibration thus preventing rear axle steering whereas the reversed arrangement with the apex of the V-shaped link connected to the chassis forwardly of the carrier will not accomplish these desirable functions.

Fig. 8 shows the type of pivotal connection used between the rear end of the lower links 31, 32 and the brackets 37 that are mounted on the axle carrier 16. Carrier brackets 37 each support an anchor bolt or pin 84 that is surrounded by a sleeve 85. The sleeve 85 is non-rotatable relative to the pin 84. Sleeve 85 is encircled by a resilient cylinder 86 that is fixedly connected to the outside of sleeve 85 by bonding or the like. Cylinder 86 in turn is encircled by and anchored to a bearing sleeve 87. The cylindrical eye portion at the rear ends of the links 31 or 32 are each connected to a bearing sleeve 87 so as to resist relative rotation therebetween. Accordingly, the pivotal movement between links 31 or 32 and the pins 84 is by virtue of sheer set up in the resilient cylinders 86.

Fig. 9 shows the pivotal connections for the forward ends of the upper and lower links 33, and 31 and 32 respectively. These pivotal connections are substantially identical to the connections shown in Fig. 8 and described above. The chassis frame side members 11 and 12 each mount a depending bracket 35 that supports an anchor bolt on pin 61. Each of the forward ends of the links 31, 32 and 33 are pivotally connected to the pivot pins 61 by resilient, bushing type, connections similar to those described with relation to Fig. 8.

I claim:

1. In a motor vehicle, a chassis frame, a rigid wheel axle carrier including a drive pinion and engaged ring gear, said carrier extending transversely of and beneath a portion of said chassis frame, resilient means extending between the chassis frame and said carrier, a pair of rigid links extending longitudinally of the chassis frame and drivingly connected between the carrier and the chassis frame at opposite sides thereof, and a V-shaped torque compensating link connecting a portion of the axle carrier, that is offset from the center of length thereof towards the drive pinion side of the ring gear, with portions of said chassis frame located forwardly of the axle carrier, said V-shaped link being disposed in a plane that extends transversely of the chassis frame and slopes forwardly and downwardly from a position located above the axle carrier, the V-shaped link having the apex portion thereof connected to the said offset portion of the axle carrier and the spaced apart free ends of the link legs thereof connected to forwardly disposed portions of the chassis frame.

2. In a motor vehicle, a chassis frame, a rigid wheel axle carrier including a drive pinion and engaged ring gear, said carrier extending transversely of and beneath a portion of said chassis frame, resilient means extending between the chassis frame and said carrier, a pair of rigid links extending longitudinally of the chassis frame and drivingly connected between the carrier and the chassis frame at opposite sides thereof, and a V-shaped torque compensating link connecting a portion of the axle carrier, that is offset from the center of length thereof towards the drive pinion side of the ring gear, with portions of said chassis frame located forwardly of the axle carrier, said V-shaped link being disposed in a plane that extends transversely of the chassis frame and slopes forwardly and downwardly from a position located above the axle carrier, the V-shaped link having the apex portion thereof connected to the said offset portion of the axle carrier and the spaced apart free ends of the link legs thereof connected to forwardly disposed portions of the chassis frame by pivotal connections that permit rotation about an axis extending transversely of the chassis frame.

3. In a motor vehicle, a chassis frame, a rigid wheel axle carrier including a drive pinion and engaged ring gear, said carrier extending transversely of and beneath a portion of said chassis frame, resilient means extending between the chassis frame and said carrier, a pair of rigid links extending longitudinally of the chassis frame and drivingly connected between the carrier and the chassis frame at opposite sides thereof, and a V-shaped torque compensating link connecting a portion of the axle carrier, that is offset from the center of length thereof towards the drive pinion side of the ring gear with portions of said chassis frame located forwardly of the axle carrier, said V-shaped link being disposed in a plane that extends transversely of the chassis frame and slopes forwardly and downwardly from a position located above the axle carrier, the V-shaped link having the apex portion thereof connected to the said offset portion of the axle carrier and the spaced apart free ends of the link legs thereof connected to forwardly disposed portions of the chassis frame by pivotal connections that permit rotation about an axis extending transversely of the chassis frame, the connection of the apex portion of the V-shaped link to the carrier permitting limited movement of the apex portion longitudinally of the carrier while resisting movement of the apex portion transversely of the carrier.

4. In a motor vehicle, a chassis frame, a rigid wheel axle carrier including a drive pinion and engaged ring gear, said carrier extending transversely of and beneath a portion of said chassis frame, resilient means extending between the chassis frame and said carrier, a pair of rigid links extending longitudinally of the chassis frame and drivingly connected between the carrier and the chassis frame at opposite sides thereof, and a V-shaped torque compensating link connecting a portion of the axle carrier, that is offset from the center of length thereof towards the drive pinion side of the ring gear, with portions of said chassis frame located forwardly of the axle carrier, said V-shaped link being disposed in a plane that extends transversely of the chassis frame and slopes forwardly and downwardly from a position located above the axle carrier, the V-shaped link having the apex portion thereof connected to the said offset portion of the axle carrier and the spaced apart free ends of the link legs thereof connected to forwardly disposed portions of the chassis frame by pivotal connections that permit rotation about an axis extending transversely of the chassis frame, the connection of the apex portion of the V-shaped link to the carrier permitting limited movement of the apex portion longitudinally of the carrier while resisting movement of the apex portion transversely of the carrier, said apex portion connection comprising a plate fixedly connected to the axle carrier, a resilient body of material extending about and connected to said plate, a casing enclosing the resilient body and connected thereto, and means on said casing adapted to be fixedly connected to the apex portion of the V-shaped link, said resilient body being formed to permit limited shear in a direction longitudinally of the carrier while resisting tension and compression.

5. In a motor vehicle, a frame, a rigid axle carrier extending transversely of said frame, gearing and axles mounted in said carrier and connected to wheels mounted on the outer ends of said axles, a drive shaft connected to said gearing at a point intermediate the ends of said carrier, resilient means extending between and supporting said frame on said carrier, a pair of horizontally disposed, rigid links extending longitudinally of the frame at each side thereof, each horizontal link having one end thereof connected to said carrier and the other end thereof connected to said frame for pivotal movement about horizontally disposed axes extending transversely of the frame, and a substantially V-shaped torque compensating link extending longitudinally of said frame and arranged in a plane that slopes forwardly and downwardly from a position above said axle carrier, said torque compensating link having the apex portion thereof connected to the carrier at a point on the drive shaft side of said gearing and laterally offset with respect to the connection between said drive shaft and said gearing, the apex portion of the V-shaped link being connected to the axle carrier at a point located above the rotational axis of the axles of the carrier and the spaced apart free ends of the legs of the V-shaped link being pivotally connected to the chassis frame forwardly of the carrier by means permitting rotational movement of the link legs about axes extending transversely of the frame.

6. In a motor vehicle, a frame, a rigid axle carrier extending transversely of said frame, gearing and axles mounted in said carrier and connected to wheels mounted on the outer ends of said axles, a drive shaft connected to said gearing at a point intermediate the ends of said carrier, resilient means extending between and supporting said frame on said carrier, a pair of horizontally disposed, rigid links extending longitudinally of the frame at each side thereof, each horizontal link having one end thereof connected to said carrier and the other end thereof connected to said frame for pivotal movement about horizontally disposed axes extending transversely of the frame, and a substantially V-shaped torque compensating link extending longitudinally of said frame and arranged in a plane that slopes forwardly and downwardly from a position above said axle carrier, said torque compensating link having the apex portion thereof connected to the carrier at a point on the drive shaft side of the gearing and laterally offset with respect to the connection between said drive shaft and said gearing, the apex portion of the V-shaped link being connected to the axle carrier at a point located above the rotational axis of the axles of the carrier and the spaced apart free ends of the legs of the V-shaped link being pivotally connected to the chassis frame forwardly of the carrier by means permitting rotational movement of the link legs about axes extending transversely of the frame, the connection of the apex portion of the V-shaped link to the axle carrier including resilient means that permit limited relative movement between the link apex and the axle carrier in a direction longitudinally of the carrier while resisting relative movement of the link apex and carrier in a direction transversely of the carrier.

7. In a motor vehicle, a frame, a rigid axle carrier extending transversely of said frame, gearing and axles mounted in said carrier and connected to wheels mounted on the outer ends of said axles, a drive shaft connected to said gearing at a point intermediate the ends of said carrier, resilient means extending between and supporting said frame on said carrier, a pair of horizontally disposed, rigid links extending longitudinally of the frame at each side thereof, each horizontal link having one end thereof connected to said carrier and the other end thereof connected to said frame for pivotal movement about horizontally disposed axes extending transversely of the frame, and a substantially V-shaped torque compensating link extending longitudinally of said frame and arranged in a plane that slopes forwardly and downwardly from a position above said axle carrier, said torque compensating link having the apex portion thereof connected to the carrier at a point on the drive shaft side of the gearing and laterally offset with respect to the connection between said drive shaft and said gearing, the apex portion of the V-shaped link being connected to the axle carrier at a point located above the rotational axis of the axles of the carrier and the spaced apart free ends of the legs of the V-shaped link being pivotally connected to the chassis frame forwardly of the carrier by means permitting rotational movement of the link legs about axes extending transversely of the frame, the offset connection of the link apex to the axle carrier being such as to produce equal loading at each of the axle mounted wheels during drive from the drive shaft to the wheels, said offset of the link apex with respect to the drive shaft being equal to the product of the rolling radius of the wheels times the vehicle wheelbase divided by the product of the drive shaft to wheel speed ratio times the height of the vehicle center of gravity above the ground surface when the ratio of the height of the horizontally disposed rigid links above the ground surface to the length of the horizontally disposed rigid links is equal to the ratio of the height of the center of gravity of the vehicle above the ground to the wheelbase of the vehicle.

8. In a motor vehicle, a frame, a rigid axle carrier extending transversely of said frame, gearing and axles mounted in said carrier and connected to wheels mounted on the outer ends of said axles, a drive shaft connected to said gearing at a point intermediate the ends of said carrier, resilient means extending between and supporting said frame on said carrier, a pair of horizontally disposed, rigid links extending longitudinally of the frame at each side thereof, each horizontal link having one end thereof connected to said carrier and the other end thereof connected to said frame for pivotal movement about horizontally disposed axes extending transversely of the frame, and a substantially V-shaped torque compensating link extending longitudinally of said frame and arranged in a plane that slopes forwardly and downwardly from a position above said axle carrier, said torque compensating link having the apex portion thereof connected to the carrier at a point of the drive shaft side of the gearing and laterally offset with respect to the connection between said drive shaft and said gearing, the apex portion of the V-shaped link being connected to the axle carrier at a point located above the rotational axis of the axles of the carrier and the spaced apart free ends of the legs of the V-shaped link being pivotally connected to the chassis frame forwardly of the carrier by means permitting rotational movement of the link legs about axes extending transversely of the frame, the offset connection of the link apex to the axle carrier being such as to produce equal loading at each of the axle mounted wheels during drive from the drive shaft to the wheels, said offset of the link apex with respect to the drive shaft being substantially equal to the product of the rolling radius of the driving wheels times the length of the horizontally disposed rigid links divided by the product of the drive shaft to wheel speed ratio times the height of the horizontally disposed rigid links above the ground surface when the ratio of the height of the horizontally disposed rigid links above the ground surface to the length of the horizontally disposed rigid links is equal to the ratio of the height of the center of gravity of the vehicle above the ground to the wheelbase of the vehicle.

JOHN P. BUTTERFIELD.

References Cited in the file of this patent
UNITED STATES PATENTS

| Number | Name | Date |
|---|---|---|
| 1,330,512 | Billinghurst | Feb. 10, 1920 |
| 1,552,790 | Zinsitz | Sept. 8, 1925 |
| 1,759,370 | Rhodin | May 20, 1930 |
| 2,238,002 | Pointer | Apr. 8, 1941 |
| 2,300,844 | Olley | Nov. 3, 1942 |
| 2,369,501 | Parker | Feb. 13, 1945 |
| 2,393,183 | Wagner | Jan. 15, 1946 |